(12) United States Patent
Krzeminski et al.

(10) Patent No.: US 8,618,186 B2
(45) Date of Patent: Dec. 31, 2013

(54) INCREASE IN THE TOUGHNESS OF A MATERIAL OBTAINED FROM A CURABLE COMPOSITION COMPRISING AT LEAST ONE VINYL ESTER MONOMER

(75) Inventors: Mickael Krzeminski, Le Bouscat (FR); Brigitte Defoort, Saint Medard En Jalles (FR); Xavier Coqueret, Reims (FR)

(73) Assignees: Astrium SAS, Paris (FR); Universite de Reims Champagne-Ardenne, Reims Cedex (FR); Centre National de la Recherche Scientifique, Paris (FR)

( * ) Notice: Subject to any disclaimer, the term of this patent is extended or adjusted under 35 U.S.C. 154(b) by 21 days.

(21) Appl. No.: 13/500,844

(22) PCT Filed: Oct. 8, 2010

(86) PCT No.: PCT/EP2010/065137
§ 371 (c)(1),
(2), (4) Date: Jul. 5, 2012

(87) PCT Pub. No.: WO2011/042554
PCT Pub. Date: Apr. 14, 2011

(65) Prior Publication Data
US 2012/0277383 A1    Nov. 1, 2012

(30) Foreign Application Priority Data
Oct. 9, 2009 (FR) ..................................... 09 57090

(51) Int. Cl.
| C08F 283/00 | (2006.01) |
| C08J 3/28 | (2006.01) |
| C08L 63/10 | (2006.01) |
| C08L 81/06 | (2006.01) |

(52) U.S. Cl.
USPC ................ 522/79; 522/74; 522/186; 525/535

(58) Field of Classification Search
USPC ......................................................... 525/535
See application file for complete search history.

(56) References Cited

U.S. PATENT DOCUMENTS

| 5,434,226 A | 7/1995 | Nguyen et al. |
| 2002/0147283 A1 | 10/2002 | Kim et al. |
| 2005/0008866 A1 | 1/2005 | Chauray et al. |
| 2008/0171207 A1 | 7/2008 | Chauray et al. |

FOREIGN PATENT DOCUMENTS

EP    1 473 325 A1    11/2004

OTHER PUBLICATIONS

International Search Report and Written Opinion issued on Dec. 13, 2010 for International Patent Application No. PCT/EP2010/065137.
Liang, et al., "Modification of vinyl ester resin by a new thermoset liquid crystalline diacrylate", Journal of Materials Science, 2005, 40, 2089-2091.
Wang, et al., "Miscibility and Morphologies of Poly(arylene ether phenyl phosphine oxide/sulfone) Copolymer/Vinly Ester Resin Mixtures and Their Cured Networks", Journal of Polymer Science Part B: Polymer Physics, 2000, 38, 2409-2421.
Preliminary Search Report issued on Apr. 20, 2010 for French Application No. FR 0957090.

*Primary Examiner* — Randy Gulakowski
*Assistant Examiner* — Christopher M Rodd
(74) *Attorney, Agent, or Firm* — Knobbe, Martens, Olson & Bear, LLP

(57) ABSTRACT

A method increases the toughness of a material obtained by curing a composition that includes at least one vinyl ester monomer. The method includes the incorporation into the composition of a sulfonated polyaromatic thermoplastic polymer, which is achieved by dissolving the vinyl ester monomer and the thermoplastic polymer in a reactive diluent in which they are both soluble. The resulting curable composition includes at least one vinyl ester monomer, and very high toughness materials can be made from it. A curable composition can include at least one vinyl ester monomer, a sulfonated polyaromatic thermoplastic polymer and a N-vinyl lactam. The compositions can be used in the aeronautical, space, railway, nautical, automotive industries, arms and other industries.

18 Claims, 1 Drawing Sheet

INCREASE IN THE TOUGHNESS OF A MATERIAL OBTAINED FROM A CURABLE COMPOSITION COMPRISING AT LEAST ONE VINYL ESTER MONOMER

RELATED APPLICATIONS

This application is a U.S. National Phase of International Application No. PCT/EP2010/065137, filed Oct. 8, 2010, designating the U.S., and published in French as WO/2011/042554 on Apr. 14, 2011 which claims the benefit of French Patent Application No. 09 57090 filed Oct. 9, 2009.

TECHNICAL FIELD

The present invention relates to a method for increasing the toughness of a material obtained by curing a composition comprising at least one vinyl ester monomer.

It also relates to a curable composition which comprises at least one vinyl ester monomer and with which materials with very high toughness may be made.

It further relates to a material obtained by curing this composition.

This material may notably be a material forming the matrix of a composite material or an adhesive material ensuring the assembling of parts together and, in particular, of parts in composite material(s).

The invention may therefore find applications in all sorts of industries and more specially in aeronautical, space, railway, nautical and automotive industries, for example for making and assembling structural parts, engine parts, compartment parts or body parts, in the arms industry, for example for making and assembling missiles or missile launching tubes, or further in the field of leisure and sports, for example for making and assembling articles intended for nautical sports and sports involving sliding.

BACKGROUND

With composite materials, it is possible to utilize the exceptional mechanical properties of certain materials, the making of which is known, not in bulk form but only as filaments. Matrices based on organic polymers are then used for binding the filaments together. But, if the intention is to obtain high performance composite materials, it is indispensable that the matrices themselves have good mechanical properties.

Now, generally, the matrices obtained from so-called "thermosetting" resins (as opposed to so-called "thermoplastic" resins) such as epoxide and vinyl ester resins, have poor elongation at break and impact resistance.

It has been known for a long time that the toughness (or "fracture toughness") of a material, i.e. its capability of opposing sudden propagation of cracks, may be improved by incorporating particles of small dimensions therein. Indeed, when a crack is formed in the material, the propagation of this crack is slowed down by the particles which act as obstacles. Plastic deformation mechanisms and notably cavitation and shear band phenomena then ensure strengthening of the material.

The idea generally considered for overcoming the low toughness of matrices obtained from thermosetting resins is therefore to incorporate into these resins a thermoplastic polymer, the role of which is to concentrate the stresses and to control the released energy upon an impact or cracking of the matrices.

Typically, this incorporation is carried out in two steps: a first step which consists of dissolving the thermoplastic polymer in the thermosetting resin until a homogeneous mixture is obtained, and a second step which consists of curing the thereby obtained mixture by hot polymerization/crosslinking of the resin. De-mixing then occurs, i.e. separation of phases, which leads to the formation of thermoplastic nodules within the cured resin.

In the case of matrices based on hot polymerizable/crosslinkable epoxide resins, it is common to use as a thermoplastic polymer, a polymer from the family of polyethersulfones (or PES) which are amorphous polymers having a high glassy transition temperature, typically about 200° C. An example of such a use is described in the U.S. Pat. No. 5,434,226 (reference [1]).

On the other hand, it is known that polyethersulfones cannot be used for increasing the toughness of matrices based on vinyl ester resins, attempts for incorporating a polyethersulfone into a vinyl ester resin having actually ended in failure because of the non-miscibility of both of these types of compound (Wang S. et al., *Journal of Polymer Science Part B: Polymer Physics*, 2000, 38, 2409-2421 (reference [2]); Liang, G. et al., *Journal of Materials Science*, 2005, 40, 2089-2091 (reference [3]).

Consequently, in the European patent application published under no. 1 473 325 (reference [4]), increasing the toughness of a matrix based on a vinyl ester resin was proposed by mixing this resin with a copolymer of arylene ether diphenylsulfone and of arylene ether triphenylphosphine (or BPA-Px) and then, after de-mixing the resulting mixture, by cold polymerizing/crosslinking the resin, i.e. in the absence of any heating.

It is found that this solution is highly effective since it leads to gains in toughness at least equal to 60% and which may attain 88% and this without altering the other properties of the matrix which are inherent to the use of a vinyl ester resin.

However, it is not totally satisfactory insofar that it cannot be applied to vinyl ester resins capable of polymerizing/crosslinking at temperatures below 70° C. on the one hand and the BPA-Px copolymers are relatively expensive products on the other hand.

The Inventors therefore set their goal to find another solution to the problem of the low toughness which matrices obtained from vinyl ester resins have, which itself is applicable both to vinyl ester resins, for which polymerization/crosslinking can only be carried out under hot conditions and to cold polymerizable/crosslinkable vinyl ester resins, and which is less costly than the one recommended in the aforementioned reference [4].

Now, it is found that within the scope of their work, the Inventors noticed that not only is it possible to make a vinyl ester resin and a thermoplastic polymer of the polyethersulfone type miscible by using a reactive diluent in which they are both soluble but also further the joint use of such a polymer and of such a diluent is expressed by gains in toughness which are still higher than those obtained with a BPA-Px copolymer.

And it is on these observations that the present invention is based.

DESCRIPTION OF CERTAIN INVENTIVE ASPECTS

The object of the invention is first a method for increasing the toughness of a material obtained by curing a composition comprising at least one vinyl ester monomer, which method comprises the incorporation into this composition of a sulfonated polyaromatic thermoplastic polymer, this incorporation being achieved by dissolving the vinyl ester monomer and the thermoplastic polymer in a reactive diluent in which they are both soluble.

In the foregoing and in the following, by "vinyl ester monomer" is meant a molecule which is capable of undergoing a polymerization/crosslinking reaction by the presence of at least two reactive sites of formula: —O—CO—CR═CH$_2$ wherein R represents a hydrogen atom or a methyl group, and this, whether this occurs under the effect of heat, of light (visible light, UV or IR), of ionizing radiation (electron beam, beta or gamma radiation, x-rays, . . . ), of an oxidation/reduction reaction or of any other means.

Typically, this molecule comprises a bisphenol A unit and/or a novolac unit and is therefore preferably selected from:

vinyl ester monomers of bisphenol A such as for example, those marketed by SARTOMER under reference SR 601E and by CYTEC under reference Ebecryl™ 600;

halogenated bisphenol A vinyl ester monomers such as for example those marketed by DOW Chemicals under references Derakane DER 510A-40 and 510C-350;

novolac vinyl ester monomers such as the one marketed by CYTEC under reference Ebecryl™ 609; and mixed vinyl ester monomers comprising both bisphenol A units and novolac units, such as for example, the one marketed by DSM Composite Resins under reference Atlac™ 430.

However, this may also be a vinyl ester monomer which comprises neither a bisphenol A unit nor a novolac unit, like a urethane acrylate monomer.

Moreover, by "reactive diluent" is meant a compound which is capable of playing both the role of a solvent towards a vinyl ester monomer and that of a co-monomer in the polymerization/crosslinking of this monomer by the presence of at least one reactive site which it includes, it being understood that within the scope of the present invention, the relevant monomer is a vinyl ester monomer.

According to the invention, the reactive diluent is preferably a N-vinyl lactam and more specially, N-vinyl-2-pyrrolidone, or N-vinyl-caprolactam.

However, any other compound in which the vinyl ester monomer and the thermoplastic monomer are soluble and which is further capable of reacting with the reactive sites of the vinyl ester monomer may also be suitable.

In this respect, it is considered within the scope of the present invention that the vinyl ester monomer and the thermoplastic polymer are soluble in a reactive diluent at a given temperature from the moment that the phase diagram of the mixture of these three compounds at this temperature includes a single-phase liquid domain which is the solubility domain.

Moreover, the thermoplastic polymer is advantageously selected from polymers which only consist of sulfone monomers, i.e. comprising at least one sulfone group (—SO$_2$—), and in particular from polysulfones, polyethersulfones and polyphenylsulfones such as for example those marketed by SOLVAY Advanced Polymers, under the references Udel™ (for polysulfones), Veradel™ and Virantage™ (for polyethersulfones) and Radel™ (for polyphenylsulfones) respectively.

Among these polymers, polyethersulfones are more preferred.

Advantageously, the composition comprises for 100 parts by mass of vinyl ester monomer:

from 14 to 400 parts by mass of thermoplastic polymer, and
from 40 to 500 parts by mass of reactive diluent.

Still better, the composition comprises for 100 parts by mass of vinyl ester monomer:

from 30 to 50 parts by mass of thermoplastic polymer, and
from 65 to 100 parts by mass of reactive diluent.

According to the invention, the method preferably comprises:

a) the dissolution of the thermoplastic polymer in the reactive diluent, and then b) the dissolution of the vinyl ester monomer in the solution obtained in step a).

Each of these dissolutions may be carried out with mechanical stirring, at room temperature or at a temperature above room temperature.

The composition may of course comprise in addition to the vinyl ester monomer, the thermoplastic polymer and the reactive diluent, one or more adjuvants which are selected depending on the mode of application of this composition and, notably on how its curing is desirably achieved, as well as on properties which are desirably imparted to the material which it is intended to make.

Thus, for example, this(these) adjuvant(s) may be selected from latent polymerization/crosslinking primers (or initiators) in the case where the curing of the composition is intended to be achieved via a thermal route, via a photochemical route or by an oxidation-reduction reaction, from polymerization/crosslinking accelerators, polymerization/crosslinking inhibitors, antioxidants, flexibilizing agents, plasticizers, anti-UV agents, flame-retardant agents, compatibilizing agents, anti-shrinkage agents and fillers, all these adjuvants and the conditions under which they may be used in the case of vinyl ester monomers being well known to one skilled in the art. On this subject, the reader may refer to reference textbooks, such as "TECHNIQUES DE l'INGENIEUR", volumes "Plastiques et Composites".

When one such adjuvant or such adjuvants are used, the latter may be added to any of steps a) and b) mentioned earlier or even after step b), i.e. after dissolution of the obtained vinyl ester monomer, unless they are already mixed beforehand with this monomer, many vinyl ester monomers actually being available commercially in the form of formulations in which they are already combined with one or more adjuvants.

According to the invention, the curing of the composition may be achieved by any means capable of inducing polymerization/crosslinking of the vinyl ester monomer and, notably, by applying a heat treatment, a treatment with light or with ionizing radiation.

To the knowledge of the inventors, curable compositions comprising both a vinyl ester monomer, a sulfone polyaromatic thermoplastic polymer and an N vinyl lactam as a reactive diluent, would never have been proposed in the state of the art.

The object of the invention is therefore a curable composition, which comprises at least one vinyl ester monomer, a sulfonated polyaromatic thermoplastic polymer and a N-vinyl lactam reactive diluent.

For this composition, it is preferred as earlier:

that the vinyl ester monomer be selected from bisphenol A vinyl ester monomers, halogenated bisphenol A vinyl ester monomers, novolac vinyl ester monomers and vinyl ester monomers comprising both bisphenol A units and novolac units;

that the thermoplastic polymer be selected from polysulfones, polyethersulfones and polyphenylsulfones; and that the N-vinyl lactam be selected from N-vinyl-2-pyrrolidone, N-vinyl-2-piperidone and N-vinyl-caprolactam.

Moreover, it is preferred that it comprises for 100 parts by mass of vinyl ester monomer:

from 14 to 400 parts by mass and, still better, from 40 to 500 parts by mass of thermoplastic polymer, and from 30 to 50 parts by mass and, still better, from 65 to 100 parts by mass of reactive diluent.

As earlier, the composition may further comprise one or more adjuvants such as those mentioned earlier.

Although, according to the invention, the composition may both be a composition curable via a thermal route and a composition curable via a photochemical route or by ionization, however it is preferred that this composition be curable under the effect of light radiation (visible light, UV or IR) or ionizing radiation (electron beam, β or γ radiation, X-rays, . . . ).

Actually, the use of compositions curable under the effect of light or ionizing radiation has a certain number of advantages as compared with that of heat-curable compositions, these advantages being notably related to the possibility of operating without any autoclave, on the one hand, which may be particularly appreciated in the case of the manufacturing and assembling of parts of large dimensions, and of obtaining higher curing rates on the other hand, which allows greater production throughputs for lower costs.

The vinyl ester monomer is therefore selected accordingly.

The composition according to the invention was found to lead, after curing, to materials which have a particularly high toughness—this toughness, as determined by the ISO 13586:2000 standard, actually being at least equal to 1.7 MPa·m$^{1/2}$ and which may even be greater than 2 MPa·m$^{1/2}$—combined with a glassy transition temperature which is also high, which makes the use of this composition particularly interesting in the field of manufacturing and assembling composite materials, notably for use in aeronautics or space.

Also, the object of the invention is further a material which is obtained by curing a curable composition as defined earlier.

According to the invention, this material preferably is either an adhesive ensuring the assembling of parts together and, in particular of parts in composite material(s), or a material forming the matrix of a composite material.

The reinforcement present in this composite material may be of different types. Thus, this may notably be a reinforcement consisting of glass fibers, quartz fibers, carbon fibers, graphite fibers, silica fibers, metal fibers such as steel fibers, aluminium fibers or boron fibers, organic fibers such as aramide fibers, polyethylene fibers, polyester fibers or poly(p-phenylene benzobisoxazole), more known under the acronym of PBO, or further silicum carbide fibers.

This reinforcement may depending on the nature of the fibers which make it up, appear as chopped strands, milled fibers, mats with continuous filaments, mats with chopped filaments, rovings, fabrics, knits, felts, . . . , or further as complexes made by combination of the different types of planar materials.

Moreover, the manufacturing of the composite material may be achieved by all techniques known to one skilled in the art of composite materials such as for example by impregnation, simultaneous injection molding, autoclave draping molding, vacuum molding, molding by low pressure injection of resin (or RTM for "Resin Transfer Molding"), wet low pressure cold press molding, molding by compound injection (or BMC for "Bulk Molding Compound"), molding by compression of pre-impregnated mass (or SMC for "Sheet Molding Compound"), by winding of filaments, by centrifugation or further by pultrusion.

Other features and advantages of the invention will become apparent upon reading the additional description which follows, which relates to an example for preparing curable compositions and materials according to the invention as well as to a demonstration of the properties of the thereby prepared materials.

It is obvious that this example is only given as an illustration of the object of the invention and by no means aims at limiting this object.

DETAILED DISCUSSION OF CERTAIN ILLUSTRATIVE EMBODIMENTS

Figure 1:
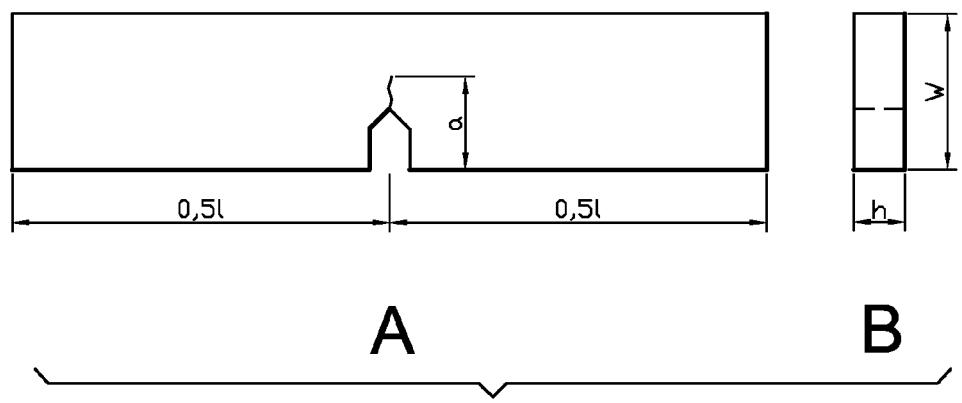
FIG. 1 schematically illustrates a test specimen, as seen from above (portion A) and as seen from a side (portion B), as used in the toughness test carried out on materials according to the invention in accordance with the ISO 13586:2000 standard.

The example which follows illustrates the preparation of compositions and materials according to the invention as well as the properties of the thereby prepared materials.

1. Preparation of the Compositions:

Three compositions according to the invention, designated hereafter as compositions 1, 2 and 3, respectively, are prepared by using:

for composition 1:

40 parts by mass of a vinyl ester resin having as a monomer, an ethoxylated bisphenol A diacrylate of the formula hereafter:

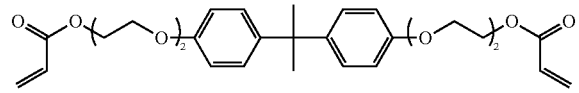

this resin being marketed by SARTOMER under reference SR 601E;

20 parts by mass of the polyethersulfone (or PES) marketed by SOLVAY Advanced Polymers under reference Virantage™ VW-10700 RFP; and 40 parts by mass of N-vinyl-pyrrolidone (or NVP);

for composition 2:

parts by mass of the same resin as the one used for composition 1;

25 parts by mass of the PES marketed by SOLVAY Advanced Polymers under reference Virantage™ VW-10200 RFP, with a higher molecular weight than the one of the PES used for composition 1; and 50 parts by mass of NVP;

for composition 3:

50 parts by mass of a vinyl ester resin having as a monomer, an epoxidized bisphenol A diacrylate of the formula hereafter:

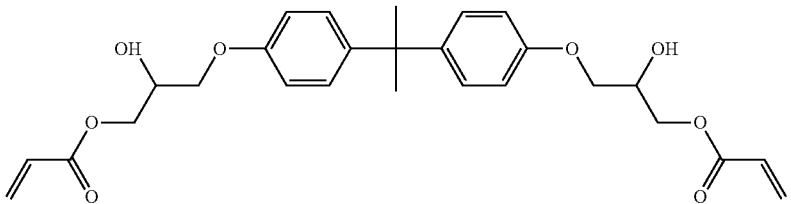 [SMILES: C=CC(=O)OCC(O)COc1ccc(C(C)(C)c2ccc(OCC(O)COC(=O)C=C)cc2)cc1]

this resin being marketed by CYTEC under reference Ebecryl™ 600;
- 16.7 parts by mass of the same PES as the one used for composition 1; and
- 33.3 parts by mass of NVP.

The compositions are prepared by first of all dissolving the polyethersulfone in N-vinyl-pyrrolidone with constant and hot mechanical stirring. To do this, this dissolution is carried out in a reactor which is immersed in an oil bath maintained at 70° C.

And the thereby obtained solution is then brought back to room temperature. The vinyl ester resin is then added thereto and the whole is heated to 50° C. in an oven, for one hour and with mechanical stirring, in order to obtain a homogeneous mixture.

Table 1 hereafter shows the dynamic viscosity η values expressed in Pa·s, as determined, by means of a rotary viscosimeter AR 2000.ex of TA Instruments, for the compositions 1 and 2, at 25° C. and 50° C. respectively and for two different gradient rates: 0.1 and 10 s$^{-1}$.

TABLE 1

| T (° C.) | Gradient rate (s$^{-1}$) | η (Pa·s) Composition 1 | η (Pa·s) Composition 2 |
|---|---|---|---|
| 25 | 0.1 | 2.80 | 47.49 |
|  | 10 | 8.40 | 39.00 |
| 50 | 0.1 | 0.85 | 9.40 |
|  | 10 | 1.73 | 8.50 |

This table shows that the compositions according to the invention may have very different viscosities depending on the selection of the vinyl ester monomer and on the PES which make them up on the one hand and, on their vinyl ester monomer, PES and NVP contents, and that it is therefore possible to act on these different parameters in order to adjust the viscosity of a composition according to the invention to the specifications imposed by the use and the application method to which it is intended.

2. Preparation of the Materials:

The compositions 1, 2 and 3 are cast in steel moulds having a measured side of 200 mm and a measured height of 5 mm, degassed in vacuo in order to remove the trapped air during the casting and then polymerized/crosslinked by ionization under an electron beam with doses of 80 kGy, by means of 1 passage with 5 kGy followed by 3 passages with 25 kGy.

3. Properties of the Obtained Materials:

The materials are subject to tests in order to determine their toughness and their glassy transition temperature.

Toughness:

The toughness (or stress intensity factor), noted as $K_{IC}$, of the materials is determined by tests which are conducted according to the ISO 13586:2000 standard which sets the methods of the toughness tests for plastic materials according to the crack opening mode (mode I).

As this standard provides two types of tests, i.e. three-point flexure tests and tensile tests on compact specimens, the toughness tests are conducted with three-point flexure tests because the machining of the specimens is much easier.

Specimens subject to three-point flexure tests or flexure specimens with a side notch (SENB for "Single Edge Notch Bending") are prepared according to FIG. 1 which schematically illustrates a specimen as seen from above (portion A) and as seen from the side (portion B). In this figure:
- w represents the width of the specimen,
- l represents its overall length,
- h represents its thickness, while
- a represents the length of the crack (notch+pre-crack).

According to the ISO 13586:2000 standard:
- l should be greater than 4.2 w,
- h should be smaller than w/2 while being greater than w/4, and
- a should be smaller than or equal to 0.55 w while being greater than or equal to 0.45 w.

For the present tests, a=5 mm+ϵ is selected wherein ϵ is the length of the pre-crack, h=5 mm, w=10 mm and l=56 mm.

The method assumes a linear elastic behavior of the materials with planar deformation at the tip of the crack. Therefore, the crack has to be sufficiently sharp so that the values which may be obtained for the measured properties are not substantially higher than those which would be obtained with an even sharper crack.

The pre-crack is made by means of an INSTRON™ 4400R apparatus equipped with a 500 N force cell, with a control console INSTRON™ 8500 and with a computer data processing system (software package INSTRON™ series IX). A razor blade is attached by a jaw to the upper end while a tray is placed underneath. The notched specimen is aligned by positioning the blade in the notch. The blade is driven at a rate of 1 or 5 mm/min down to a depth from 0.15 to a maximum of 0.4 mm. The displacement conditions of the razor blade are defined beforehand. According to the standard, the increase in the length of the thereby obtained crack should be greater than four times the original radius of the tip of the notch.

The tests are conducted on a tensile test machine INSTRON™ 4400R equipped with a 10 kN force cell, with a control console INSTRON™ 8500 and a computer data processing system (software package INSTRON™ series IX).

Figure 2:
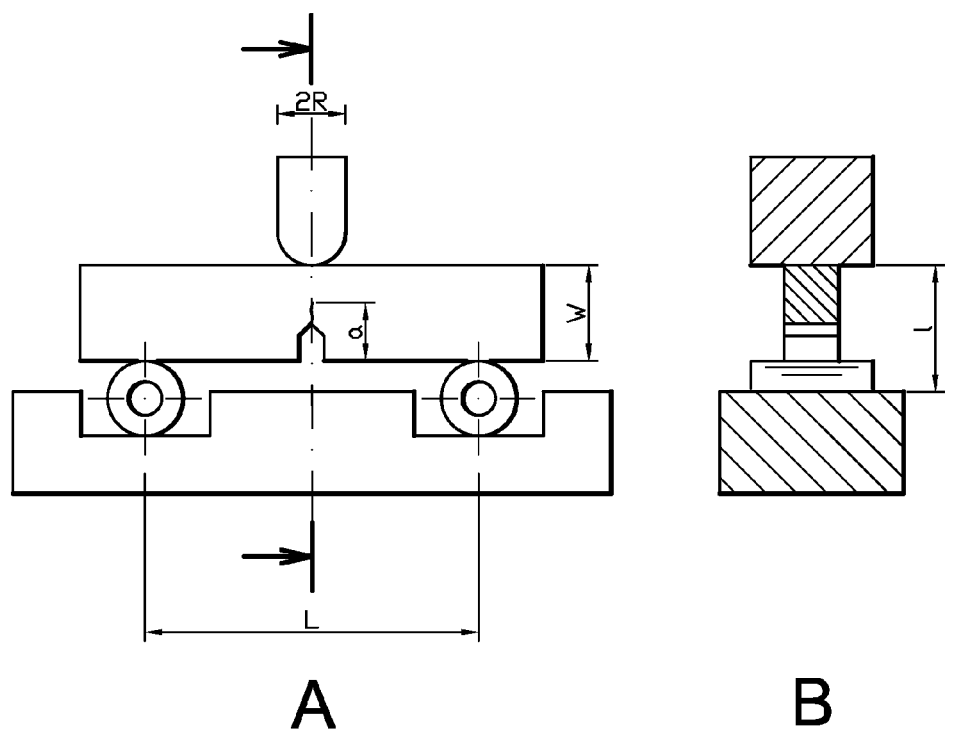
FIG. 2 schematically illustrates the assembly, top view (portion A) and cross-sectional view (portion B), as used on a tensile test machine INSTRON™ 4400R in the toughness tests carried out on materials according to the invention in accordance with the ISO 13586:2000 standard.

FIG. 2 schematically illustrates the assembly including two rollers and a displacement sensor as used on the tensile test machine INSTRON™ 4400R, seen from above (portion A) and seen as a cross-sectional view (portion B).

In this figure:
- L represents the span,
- R represents the radius,
- h represents the thickness, while
- l represents the distance monitored by the displacement sensor.

L should be equal to 4 w±0.1 w, while R should be less than w/2 and greater than w/8.

Within the scope of the present tests, the span is 40 mm and the radius of the rollers is 5 mm.

The critical stress intensity factor $K_{Ic}$ (noted as $K_Q$ for the moment) is calculated by the following formula:

$$K_Q = \frac{f(a/w) \times F_Q}{h \times \sqrt{w}}$$

wherein:

$F_Q$ is the load at the beginning of the propagation of the crack (maximum load measured on the curve giving the load versus the displacement), h is the thickness of the specimen, w is the width of the specimen, f(a/w) is the calibration factor related to the geometry, depending on the length a of the crack.

$$f(x) = 6 \times x \times \frac{1.99 - x(1-x)(2.15 - 3.93x + 2.7x^2)}{(1+2x)(1-x)^{3/2}}$$

with x=a/w

The results of the test should not be considered as valid if the dimensions of the specimens are significantly greater than the plastic area surrounding the tip of the crack, characterized by the value $\bar{r}$ defined by the formula:

$$\bar{r} = \frac{K_Q^2}{\sigma_y^2}$$

wherein $\sigma_y$ is the stress at the uniaxial tensile flow threshold or 0.7 time the stress at the compressive flow threshold.

In order to be considered as suitable for the failure tests by planar deformation, the specimens should meet the following three dimensional criteria:

h>2,5$\bar{r}$
a>2,5$\bar{r}$
(w−a)>2,5$\bar{r}$.

Given the specimen dimensions proposed in the standard, it is sufficient that one of the above criteria is met so that all the other ones are also met.

If the different criteria are met, then $K_Q$ is equal to $K_{Ic}$.

Glassy Transition Temperature:

The glassy transition temperature is determined by dynamic mechanical analysis (DMA) by means of a TA2980 apparatus from TA Instruments, this technique actually having the advantage of subjecting the analyzed materials to only very small deformations and, as such, of not modifying the structure.

The measurements are made in a dual cantilever flexural mode by using the following operating conditions: loading frequency: 1 Hz; amplitude: 30 μm; range of temperatures: from −60 to 250° C. with a ramp of 5° C./min; coolant gas: nitrogen.

Results:

Table 2 hereafter shows the toughness values $K_{IC}$, expressed in MPa·m$^{1/2}$, and the values of the glassy transition temperature Tg, expressed in ° C., which were obtained by the tests described hereinbefore for materials prepared from the compositions 1, 2 and 3, as well as those which were obtained, under the same conditions, for materials resulting from curing by ionization under an electron beam, at doses of 80 kGy (1 passage with 5 kGy+3 passages with 25 kGy), of SR 601E and Ebecryl™ 600 resins alone.

It also shows the gains in toughness ($\Delta K_{IC}$), expressed as percentages, exhibited by the materials prepared from the compositions 1, 2 and 3, the reference toughness value being, for the compositions 1 and 2, that of the material resulting from the curing of the SR 601E alone, and for the material 3, that of the material resulting from the curing of the Ebecryl™ 600 resin alone.

Each toughness value which is shown in Table 2 corresponds to the average of values obtained for 5 to 8 measurements conducted on different specimens of a same material.

TABLE 2

| Materials | $K_{Ic}$ (MPa·m$^{1/2}$) | $\Delta K_{Ic}$ (%) | Tg (° C.) |
|---|---|---|---|
| SR 601E resin | 1 ± 0.03 | | 70 |
| Composition 1 | 2.23 ± 0.11 | 123 | 130 |
| Composition 2 | 2.32 ± 0.10 | 132 | 152 |
| Ebecryl ™ 600 resin | 0.8 ± 0.04 | | 145 |
| Composition 3 | 1.94 ± 0.06 | 142 | Not available |

This table shows that the materials according to the invention all have a toughness at least equal to 1.7 MPa·m$^{1/2}$ and that for each of them, this toughness is even greater than 2 MPa·m$^{1/2}$.

As an indication, the toughness of the materials described in reference [4], although already excellent, does not exceed 1.6 MPa·m$^{1/2}$.

Further, the gains in toughness obtained according to the invention are significantly higher than those obtained in reference [4] since they range from 123 to 142% while the best gain in toughness of this reference is 88%.

Moreover, this table shows that the materials according to the invention also have a high glassy transition temperature.

Their use as matrices of composite materials or as adhesives for assembling parts in composite material(s), notably for aeronautical or space use, is therefore of particular interest.

QUOTED REFERENCES

[1] U.S. Pat. No. 5,434,226
[2] Wang S. et al., *Journal of Polymer Science Part B: Polymer Physics*, 2000, 38, 2409-2421
[3] Liang, G. et al., *Journal of Materials Science*, 2005, 40, 2089-2091
[4] Application EP 1 473 325

What is claimed is:

1. A method for increasing a toughness of a material obtained by curing a composition comprising at least one vinyl ester monomer, comprising:

adding a sulfonated polyaromatic thermoplastic polymer to the vinyl ester monomer before curing the composition, and wherein adding the sulfonated polyaromatic thermoplastic polymer into the composition comprises dissolving the vinyl ester monomer and the sulfonated polyaromatic thermoplastic polymer in a N-vinyl lactam in which said vinyl ester monomer and said sulfonated polyaromatic thermoplastic polymer are both soluble.

2. The method of claim 1, wherein the vinyl ester monomer is a bisphenol A vinyl ester monomer, a halogenated bisphenol A vinyl ester monomer, a novolac vinyl ester monomer or a vinyl ester monomer comprising both bisphenol A units and novolac units.

3. The method of claim 1, wherein the N-vinyl lactam is N-vinyl-2-pyrrolidone, N-vinyl-2-piperidone or N-vinyl-caprolactam.

4. The method according to claim 1, wherein the sulfonated polyaromatic thermoplastic polymer is a polysulfone, a polyethersulfone or a polyphenylsulfone.

5. The method of claim 4, wherein the sulfonated polyaromatic thermoplastic polymer is a polyethersulfone.

6. The method of claim 1, wherein the composition comprises for 100 parts by mass of the vinyl ester monomer:
from 14 to 400 parts by mass of the sulfonated polyaromatic thermoplastic polymer, and
from 40 to 500 parts by mass of the reactive diluent.

7. The method of claim 1, which comprises:
a) the dissolution of the sulfonated polyaromatic thermoplastic polymer in the N-vinyl lactam, and then
b) the dissolution of the vinyl ester monomer in the solution obtained in a).

8. A curable composition, which comprises at least one vinyl ester monomer, a sulfonated polyaromatic thermoplastic polymer and a N-vinyl lactam.

9. The composition of claim 8, wherein the vinyl ester monomer is a bisphenol A vinyl ester monomer, a halogenated bisphenol vinyl ester monomer, a novolac vinyl ester monomer or a vinyl ester monomer comprising both bisphenol A units and novolac units.

10. The composition of claim 8, wherein the N-vinyl lactam is N-vinyl-2-pyrrolidone, N-vinyl-2-piperidone or N-vinyl-caprolactam.

11. The composition of claim 8, wherein the sulfonated polyaromatic thermoplastic polymer is a polysulfone, a polyethersulfone or a polyphenylsulfone.

12. The composition of claim 11, wherein the sulfonated polyaromatic thermoplastic polymer is a polyethersulfone.

13. The composition of claim 8, which comprises for 100 parts by mass of the vinyl ester monomer:
from 14 to 400 parts by mass of the sulfonated polyaromatic thermoplastic polymer, and
from 40 to 500 parts by mass of N-vinyl lactam.

14. The composition of claim 8, which is curable under the effect of a light or ionizing radiation.

15. A material obtained by curing a curable composition as defined in claim 8.

16. The material of claim 15, which has a toughness ($K_{IC}$) at least equal to 1.7 MPa·m$^{1/2}$ as determined according to ISO 13586:2000 standard.

17. The material of claim 15, which is an adhesive ensuring an assembling of parts together.

18. The material of claim 15, which is a matrix of a composite material.

* * * * *